Patented Sept. 8, 1936

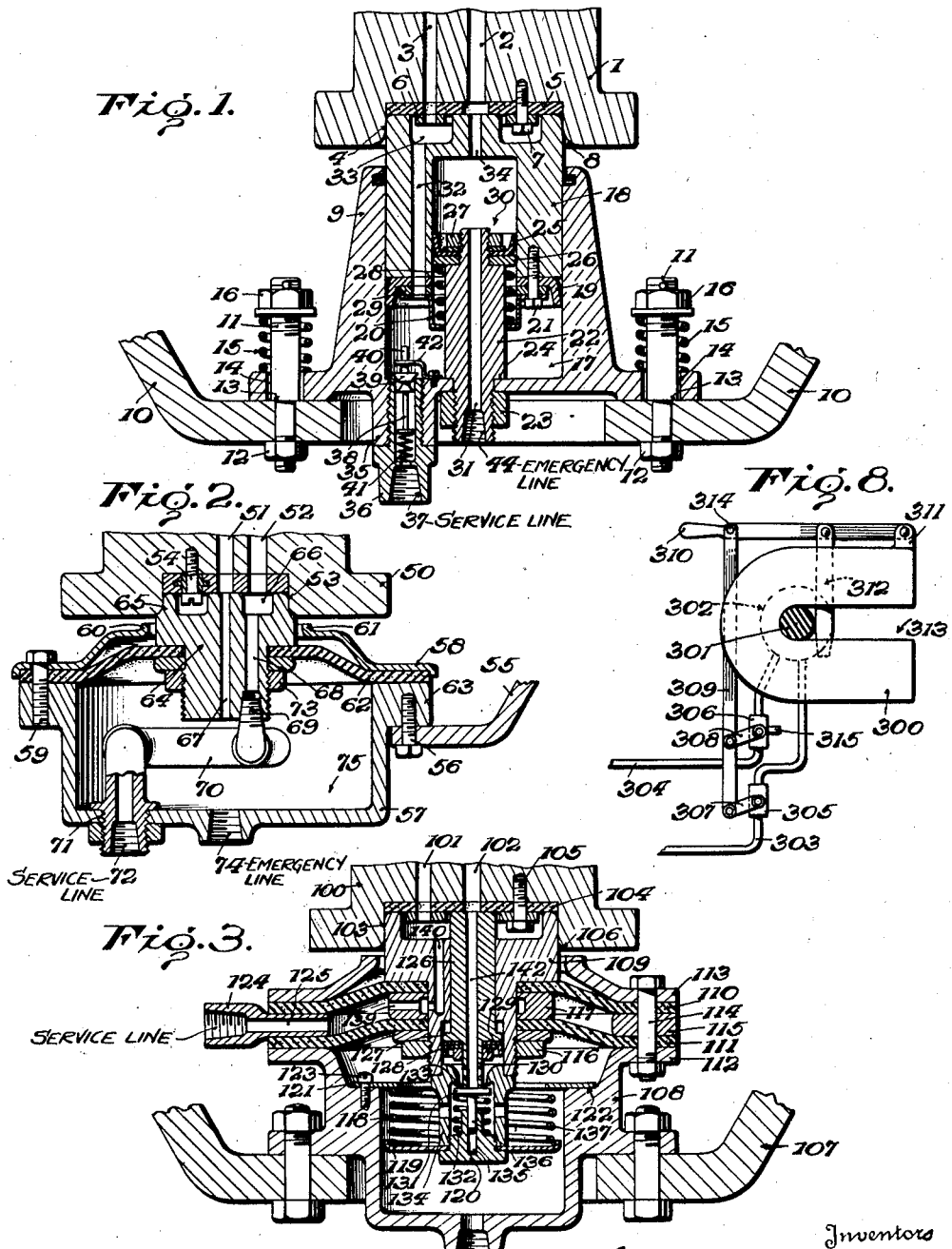

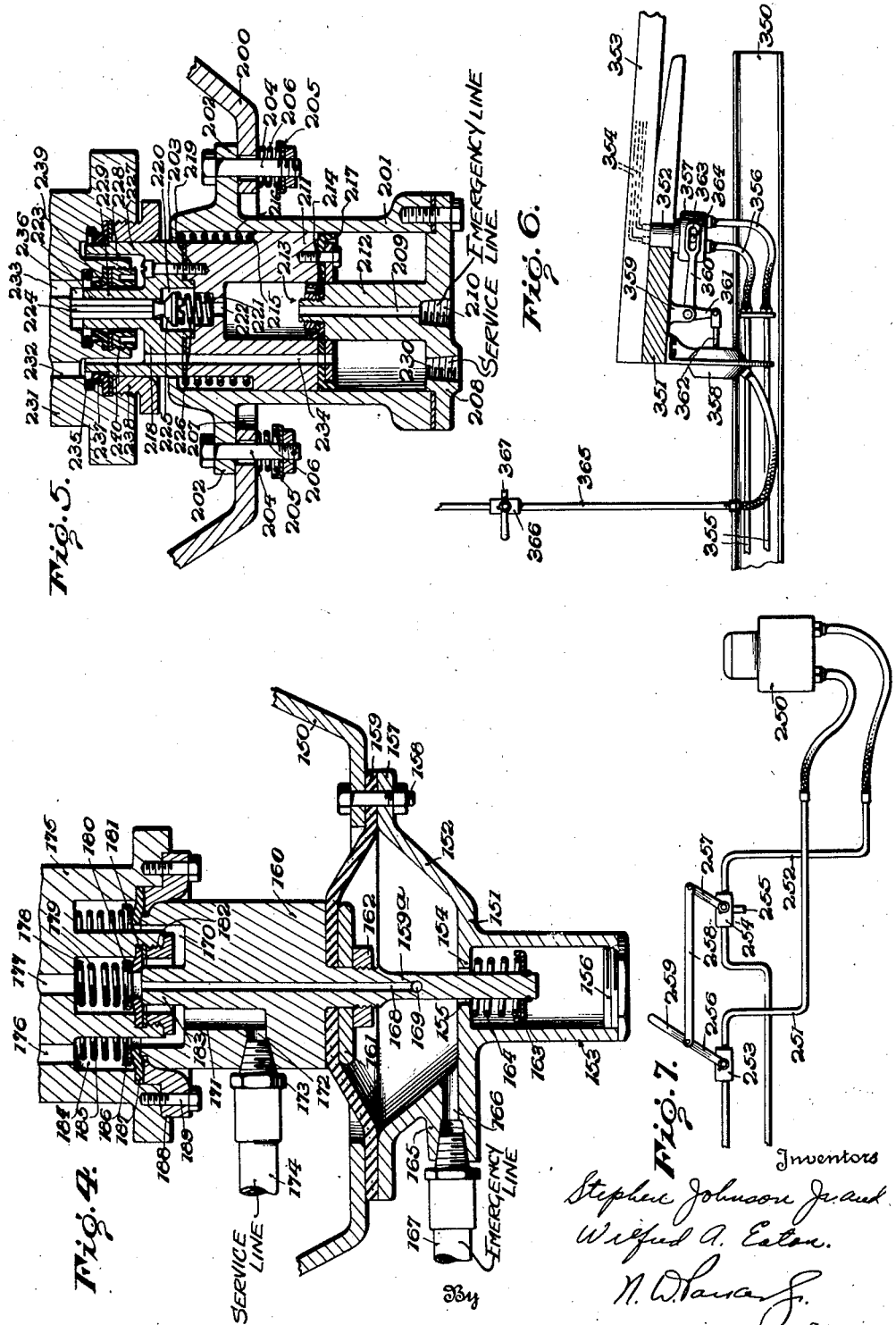

2,053,614

UNITED STATES PATENT OFFICE 2,053,614

BRAKE MECHANISM

Stephen Johnson, Jr., and Wilfred A. Eaton, Pittsburgh, Pa., assignors to Bendix Westinghouse Automotive Air Brake Company, Pittsburgh, Pa., a corporation of Delaware Application November 22, 1932, Serial No. 643,903

10 Claims. (Cl. 280—33.1)

This invention relates to braking systems for tractor-trailer vehicle trains and more particularly to means for coupling the braking system of a tractor vehicle to that of a trailer vehicle.

An object of the present invention is to provide novel pressure-operated means for coupling the braking system of a tractor to that of a trailer.

Another object of the invention is to provide novel pressure-operated means for coupling the fluid pressure braking system of a tractor vehicle to the fluid pressure braking system of a trailer vehicle.

Another object is to provide means for coupling the fluid pressure braking systems of a tractor and a trailer vehicle which means will employ the pressure in the braking system of one of the vehicles to effect the coupling.

Another object is to provide means for employing the pressure in the fluid pressure braking system of a tractor vehicle to couple the tractor braking system to that of a trailer vehicle.

A further object is to provide a coupling means between the fluid pressure braking system of a tractor vehicle and that of a trailer vehicle, in which an air-tight seal will be maintained by the pressure in the tractor braking system.

A further object is to provide means for coupling the fluid pressure braking system of a tractor vehicle to that of a trailer vehicle, which means will not in any way be operative on tractor brake application, when the tractor and trailer vehicles are uncoupled.

A still further object is to provide manually-operable means, in connection with mechanism for coupling the fluid pressure braking systems of tractor and trailer vehicles, which means may be operated to shut off the connections to the coupling means for rendering the same inoperative and isolating the tractor braking system.

A still further object is to provide, in conjunction with manually-operated means for locking together the tractor and trailer vehicles, means for rendering inoperative the means for coupling the tractor and trailer fluid pressure braking systems.

A still further object is to provide a novel means for coupling the braking systems of tractor and trailer vehicles which will be simple in construction and operation and will include a minimum number of parts, whereby a commercially practicable structure will be realized.

Referring now to the drawings, in which similar reference characters denote like parts:

Fig. 1 is a sectional view of one form of the invention;

Fig. 2 is a sectional view of a second form of the invention;

Fig. 3 is a sectional view of another form of the invention;

Fig. 4 is a sectional view of still another form of the invention;

Fig. 5 is a sectional view of a further form of the invention;

Fig. 6 is a plan view of a still further form of the invention;

Fig. 7 is a view showing a conduit controlling means forming part of the invention, and Fig. 8 is a view showing another arrangement of the conduit controlling means.

Referring now particularly to Fig. 1 of the drawings, wherein is disclosed one form of the tractor-trailer braking system connecting means forming the subject of the present invention, the same has been disclosed in combination with a king-pin device 1 which forms part of the usual tractor-trailer connecting means and is adapted to cooperate with the fifth wheel device of usual construction carried by the tractor vehicle. The king-pin device 1 forms a part of the trailer fifth wheel and is bored longitudinally to provide the passages 2, 3, leading respectively to the trailer emergency valve device and the trailer relay valve device. The lower face of the king-pin 1 is countersunk, as shown at 4, and received in the bottom of said countersunk portion is a sealing washer 5, preferably of leather or rubber, the same being held in place by a clamping ring 6 and screws 7. The lower end of the countersunk portion may be flared, as shown at 8, to act as a guide for the tractor coupling member during the coupling operation.

Coupling means are provided for engaging the king-pin member to provide a connection between the tractor braking system and the connections through the king-pin to the trailer braking system. Such means comprise a cylinder body 9, the same being flexibly attached to a bracket 10 which is rigidly secured to the under side of the usual tractor fifth wheel device. Such flexible connections comprise bolts 11, attached to the bracket 10 by nuts 12 and offset portion 13, and extending through enlarged holes 14 in laterally-extending flanges formed on the lower part of the cylinder body 9. Springs 15 are disposed about bolts 11 and bear at their lower ends on the above mentioned flanges and at their upper ends on nuts 16 which are screwed onto the bolts. It will be apparent that such mounting allows a limited movement of the cylindrical member 9 relatively to bracket 10 thus compensating for any misalignment of the cooperating members of the coupling means. The cylindrical member 9, as shown, is bored internally to provide a vertically-extending passage 17 adapted to slidably receive a coupling piston member 18, the same being provided, on its lower face, with a cup-shaped washer 19, attached thereto by a clamping ring 20 and screws 21, and providing a sealing engagement between the piston 18 and cylindrical bore 17. Piston 18 is provided with a concentric, internal, cylindrical bore 30, which is adapted to receive an upwardly-extending rod member 22 which is secured, at its lower end, to cylindrical member 9 by nuts 23 and shoulder 24. The rod member 22 is provided at its upper extremity with a cup-shaped sealing washer 25 and a follower member 26, both secured to member 22 by nuts 27. Piston member 18 is constantly urged to its lowermost position by a spring 28 which bears at its upper end against the follower member 26 and at its lower end against a spring seat 29 which is attached to the lower face of piston member 18 by screws 21. Rod member 22 is provided with a passage 31 extending longitudinally therethrough and communicating at its upper end with the bore 30 and at its lower end being screw-threaded as at 44 for connection to the tractor emergency line. Piston member 18 is provided with a longitudinally-extending bore 32, the same communicating at its lower end with bore 17 in cylindrical member 9, and at its upper end being open to an annular recess 33 which, when the piston member 18 abuts the king-pin device 1, communicates with the passage 3 in the king-pin. Piston member 18 is also concentrically bored as at 34 to provide a communicating passage between the chamber 30, passage 31, and the bore 2 in king-pin device 1, such communication being effective when the piston member 18 is raised. Formed on the lower side of the cylindrical member 9 is a downwardly-extending cylindrical portion 35, the same being formed with an internal passage for receiving an attaching member 36, which is internally screw-threaded at 37 for connection to the service line of the tractor braking system. The member 36 is bored longitudinally to receive a valve stem 38, the same being slidable within said longitudinal bore and being provided at its upper end with a valve member 39 and an upwardly-extending stem or pin 40. A spring 41 constantly urges the valve member to its uppermost position, and a stop member 42, attached to the cylindrical member 9 and having an arm through which passes the stem 40, limits the upward movement of the valve and attached portions.

In the operation of the above described structure, the tractor service line, leading from the tractor brake valve, is attached to the screw-threaded portion 37 and the tractor emergency line is connected to the screw-threaded portion 44. It will be apparent to those skilled in the art that no fluid under pressure will flow through the service line until the tractor brake valve is operated, but that fluid is constantly maintained under pressure in the emergency line, and that a valve may be placed in the emergency line, which, when the above couplings are completed, may be operated by the driver to admit fluid under pressure through such emergency line to the coupling device. In the normal, inoperative positions of the parts, the spring 28 holds the piston member 18 in its lowermost position and the lower face of such piston member abuts the stem 40 of the valve device 38, holding the seating member 39 against its seat on the member 36. When the above mentioned valve in the emergency line is operated by the driver, fluid under pressure will flow through passage 31 to chamber 30 and due to the fact that the area of passage 31 is larger than that of passage 34, pressure will build up in chamber 30 faster than it can escape to atmosphere through passage 34 and the build-up of pressure on the upper face of chamber 30 will cause piston member 18 to rise into engagement with the countersunk portion of king-pin device 1, the king-pin device and cylindrical member 9 having first been longitudinally aligned by proper manipulation of the tractor vehicle. The tractor emergency line is thus connected to the trailer emergency line through passage 31, chamber 30, passage 34, and passage 2 in the king-pin device. As the piston member 18 rises into engagement with the king-pin device 1, the bottom face thereof will move out of engagement with the stem 40, whereby the spring 41 will raise the valve stem 38 and attached parts and move valve 39 away from its seat, thereby connecting the tractor service line to the trailer service line through attaching means 37, past valve 38, 39, chamber 17, passage 32, and passage 3 in the king-pin device. Due to the fact that fluid under pressure is constantly maintained in the emergency line of the system, the piston member will be constantly maintained in its uppermost position and against the sealing member 5 in the countersunk portion of the king-pin by fluid under pressure acting on the upper face of the bore 30 in the piston member. In such raised position, the spring 28 will be compressed between the fixed member 26 and the spring bearing 29 on the piston member. If, now, the tractor and trailer vehicles are to be uncoupled, the valve in the tractor emergency line is closed and chamber 30 vented to atmosphere through passage 31 and such valve, thereby causing the spring 28 to expand and force piston member 18 to its lowermost position and out of engagement with king-pin member 1. As the piston member is forced downwardly, the lower face thereof will abut the stem 40 and continued downward movement of the piston member will force valve member 39 against its seat, thereby shutting off the tractor service line.

It is to be noted that in the above described structure the high-pressure emergency line is placed in the center of the device and opens into the relatively small chamber 30, which is usually at atmospheric pressure. The relatively small cup washer 25, in combination with the high pressure maintained in the emergency line provides an air-tight seal for the emergency line. The service line is not constantly maintained at a pressure higher than atmospheric, but is only intermittently subjected to higher pressures. Such line is therefore made to open into the larger chamber 17 having the larger sealing washer 19.

A second form which the invention may take is disclosed in Fig. 2 in which the connecting device is shown in combination with a king-pin device 50, mounted on the trailer and having longitudinal passages 51 and 52 extending therethrough for attachment to the trailer emergency line and trailer service line respectively. The lower face of the king-pin device is countersunk as at 53 to receive a suitable sealing washer, which may be attached to the king-pin device by any suitable means, such as the screws 54 as shown. The opening of the counterbore is flared outwardly as shown to act as a guide for the cooperating connecting member.

Mounted on the lower part of the tractor fifth wheel device is a bracket member 55, the same having attached thereto by any suitable means, such as screws 56, a cylindrical, cup-shaped member 57 having a cover 58, which may be attached to the cylindrical member 58 by screws 59, and which is provided with a central opening 60, having an upwardly-directed flange 61. A flexible diaphragm 62 is mounted within the cylindrical member 57 and has its marginal edge supported between a flange 63 on the cylindrical member 57 and the cover 58, whereby the diaphragm is supported within such cylindrical member. Carried by the diaphragm 62 and connected thereto by nuts 73 and positioned centrally thereof to extend through the opening 60 in the cover 58, is a connecting member 64, the same being provided at its upper end with an annular cavity 66 surrounded by a peripheral rounded portion 65 for cooperation with the flared guide portion of the counterbore in the king-pin. The connecting member 64 is provided with two longitudinal passages or bores 67 and 68, the bore 67 being adapted to align at its upper end with the king-pin bore 51 and at its lower end opening into the chamber 75 formed by the cylindrical member 57. The bore 68 opens at its upper end into the annular recess 66, which is adapted to cooperate with the king-pin bore 52, and at its lower end is connected, by any suitable means, such as the screw-thread connection 69, to a flexible tube 70, the other end of which is screw-threaded, as at 71, to the lower face of the cylindrical member 57, and is internally screw-threaded, as at 72, for connection to the tractor service line. A screw-threaded opening 74 is also provided in the lower face of the cylindrical member 57, to which the tractor emergency line may be attached.

In the operation of the above described construction, when the tractor and trailer vehicles are disconnected, the chamber 75 is open to atmosphere through a suitable valve device in the tractor emergency line, and the connecting member will, by its own weight, assume the lowest position allowed by the flexible diaphragm 62, the flexible tube 70 permitting such lowering of the member 64 and diaphragm 62. When the tractor and trailer vehicles are connected and it is desired to operatively connect the braking systems of the two vehicles, the valve in the emergency line may be operated to shut off the connection to atmosphere and connect the chamber 75 to the emergency line of the tractor through coupling 74. The build-up of pressure in chamber 75 will be rapid due to the small area of passage 67 and such pressure will act on the lower side of diaphragm 62 and raise the same, thereby raising the connecting member 64 into engagement with the king-pin device and registering the passages 51, 52 of such king-pin device with the passages 67, 68 of the connecting member. As pressure is constantly maintained in the emergency line, the diaphragm and connecting member will be maintained in their uppermost positions until it is desired to disconnect the tractor and trailer vehicles.

A third form which the invention may take is illustrated in Fig. 3 and is shown therein in combination with a king-pin device 100 having the longitudinal passages 101 and 102 therein for connection to the trailer service line and the trailer emergency line respectively. The lower face of the king-pin 100 is counterbored at 103 to receive a sealing washer 104 which may be attached therein by screws 105. The counterbore may be outwardly flared as shown at 106 to act as a guide for the cooperating connecting device.

The tractor portion of the connecting device may be mounted on a bracket 107 which is attached to the lower part of the tractor fifth wheel, and comprises a cylindrical cup-shaped member 108 and a piston member 109, mounted concentrically with the member 108 and supported in such position by flexible diaphragms 110 and 111 which are secured at their marginal portions between a flange 112 on the member 108 and a cover 113, such cover and flange being rigidly connected, as by bolts 114. The diaphragms are spaced apart at their marginal portions by a spacer ring 115, and at their center portions are provided with openings receiving a reduced portion of the piston member 109, to which the diaphragms are rigidly attached, as by a nut 116. The center portions of the diaphragms are spaced apart by a second spacer ring 117 which is also rigidly held in position between the two diaphragms by the nut 116. The piston member 109 is constantly urged to its lowermost position by a spring 118 which bears at its lower end against a bearing member 119 which is attached to the piston member by nut 120, and which at its upper end bears against a ring 121, rigidly attached to a shoulder 122 of the cylindrical member 108 by screws 123.

The piston member 109, as shown, is bored longitudinally and concentrically to provide a chamber wherein is mounted a tubular, sliding member 126, the same being formed with an annular shoulder 127 which slides in an enlarged portion of the bore in the piston member, and which has attached on the lower face thereof a cup-washer 128, the same being held in place by a nut 129. The sliding member 126 is formed with a reduced, downwardly-extending, tubular portion 130, the same abutting at its lower end a disk valve member 131 against the lower side of which a spring 132 bears to normally seat said disk valve on its annular seat 133. The latter surrounds and is spaced a small distance from the end of the tubular extension 130, and is an integral part of a cylindrical member 134, the same being closed at its lower end by screw cap 120 against which the lower end of spring 132 bears, and which is also provided with the passage 135 for slidably receiving the stem 136 of the valve 131. The cylindrical member 134 is provided with passages 137 through the walls thereof, and the piston member 126 is provided with a longitudinal passage 142 therethrough, the same being adapted to register with the passage 102 in the king-pin device when the tractor and trailer vehicles are brought together.

Means are provided for connecting the tractor and trailer service lines through the above described structure, such means comprising a nipple member 124 attached to or formed integrally with the spacer ring 115 and provided with a passage 125 extending therethrough and communicating at its inner end with the space between the diaphragms and at its outer end screw-threaded for attachment to the tractor service line. The spacer ring 117 is bored, as at 139, and such passage 139 communicates with a passage 140 in the connecting member 109. Passage 140 is adapted to communicate with passage 101 in the king-pin device when the two parts are brought together.

Means are provided for connecting the tractor and trailer emergency lines and such means comprise a screw-threaded opening 141 in the cylinder member 108 to which may be attached the tractor emergency line, and the passage 142 bored longitudinally through the sliding member 126 and communicating, by ports in the tubular extension 130, with the interior of the cylinder 134.

In the operation of the above described structure, the normal or inoperative position of the parts is such that the piston member 109 is held in its lowermost position by the tension of spring 118, and the disk valve 131 is held against its seat 133 by spring 132, thereby shutting off any connection between the passage 142 and the interior of member 108. As hereinbefore stated, the tractor service line, which normally contains no fluid under pressure, may be connected to the nipple 124, and the tractor emergency line, which is constantly charged with fluid under pressure, may be connected to the screw-threaded attaching means 141. Pressure from the tractor emergency line will flow into the interior of member 108 and will act on the lower side of diaphragm 111, thereby raising the same, together with the piston member 108. Before piston member 109 is raised, no fluid under pressure from the tractor emergency line will flow to passage 142 due to the fact that disk valve 131 is held against its seat 133 by spring 132. However, when piston member 109 abuts the king-pin device 100, the sliding member 126, the upper end of which has heretofore been held slightly above the upper face of piston member 109, will also abut the king-pin device and will be forced downwardly relative to piston member 109, thereby opening disk valve 131 against the force of spring 132 and connecting the tractor and trailer emergency lines through ports 137, past disk valve 131 and valve seat 132, through the ports in the tubular extension 130, and through passages 142 and 102. The tractor and trailer service lines will be connected through nipple 124, passage 125, the space between the diaphragms, passage 139, passage 140 and passage 101 in the king-pin device. A sealing engagement will be maintained between the upper face of the sliding member 126 and the sealing washer 104 by the fluid pressure acting on the lower side of the shoulder 127 on the sliding member, washer 128 preventing the escape of compressed fluid past such shoulder. If it is desired to retract the piston member 109 when uncoupling the tractor and trailer vehicles, the interior of member 108 must be vented to the atmosphere through suitable valve means in the tractor emergency line. The resulting decrease in pressure acting upwardly on diaphragm 111 will permit spring 118 to return the piston device 109 and associated parts to their lowest positions.

Referring now to Fig. 4, in which still another form of the invention has been disclosed, the same has been illustrated in combination with a tractor vehicle having the bracket 150 attached to the lower part of the fifth wheel device mounted thereon. The tractor-carried part of the present form of the invention comprises a cylinder member 151, the same having an upper cup-shaped portion 152 and a lower, cylindrical body 153, the two portions being integrally united but the interiors thereof being separated by a wall 154 having an opening 155 therein. The lower end of the cylindrical portion 153 may be closed by a cap 156, as shown. The upper cup-shaped member is provided with a marginal flange 157, whereby the entire member 151 may be attached to the bracket 150, as by bolts 158. A diaphragm 159 closes the upper end of the cup-shaped member 152 and is held in place at its marginal portion between the flange 157 and bracket 150. The diaphragm is provided with a centrally-located aperture through which extends the reduced end 159a of a piston member 160, and the piston member and diaphragm may be held rigidly together by means of nut 162 and plate 161, the nut member being screwed on the reduced portion 159a, whereby the diaphragm, piston, and reduced portion operate in unison. The lower end of reduced portion 159a extends through the aperture 155 and into the cylindrical lower portion 153, and has attached to the lower end thereof, by any suitable means, a spring bearing plate 163. A spring 164 bears at its lower end against such bearing plate and at its upper end bears against the partition 154, thereby constantly urging the diaphragm, piston, and reduced portion to their lowermost positions. The cup-shaped member 152 is provided with an outwardly-projecting boss 165 having a passage 166 therethrough terminating in a screw-threaded connecting portion which may be connected, as by hose 167, to the tractor emergency line. The piston member and the reduced extension portion 159a are provided with a bore 168 extending longitudinally therethrough and connecting, through a passage 169, with the interior of the cup-shaped member 152, such bore opening at its upper end to atmosphere at the center of the upper face of piston member 160. Such upper face of the piston member 160 is provided with an annular recess, for a purpose to be described hereinafter, and the marginal edge of said upper face is rounded or beveled to assist the piston in centering itself when raised to operative position. Communicating with the annular recess 170 and formed longitudinally in the piston member 160, is a passage 171, the same being connected, at its lower end, by a bore 172, to a screw-threaded portion 173 which may be connected, as by hose 174, to the service line of the tractor vehicle.

Mounted on the trailer vehicle in the usual manner is a king-pin device 175, the same being provided with longitudinal bores 176 and 177 for connection to the trailer service line and the trailer emergency line respectively. The lower face of the king-pin is centrally-recessed as at 178 to provide a chamber which communicates with the passage 177 and in which is seated a spring 179, the lower end of which seats in an annular bearing ring 180, which, in turn, seats on an annular rubber or leather ring 181 which is rigidly attached, at its marginal portion, to the king-pin device by means of a nut 182. The passage through the center of ring 181 is adapted to be aligned with the passage 168 in the piston member 160 when such piston member is raised into engagement with the king-pin device, and the centrally-disposed boss 183 on the piston member 160 is adapted to raise the flexible portion of the bearing ring 181 against the force of spring 179, thereby providing a sealing connection between the passages 168 and 177. Also provided in the lower portion of the king-pin device 175 is an annular recess 184, the same communicating with passage 176 in the king-pin device, and housing a spring 185, the same bearing at its lower end against an annular bearing member 186, which, in turn, bears against a rubber or leather bearing ring 187. The bearing ring 187 is clamped at its marginal portion to the king-pin device by means of an annular ring 188, attached to the king-pin by screws 189, and which is flared interiorly and outwardly to provide a guide for the piston member 160.

In the operation of the above described device, the tractor vehicle is first maneuvered to place the piston member 160 centrally below the king-pin device 175, at which time the tractor and trailer vehicles may be coupled. In order to now connect the tractor and trailer braking systems, a suitable valve in the tractor emergency line 167 may be operated to admit emergency line pressure to the interior of cylinder member 151, the diaphragm 159, piston 160, and extension 159ª being, until such pressure is admitted, maintained in their lowermost and inoperative positions by spring 164. Fluid under pressure will flow into the interior of cup-shaped member 152 through passage 166, and due to the small area of the passage 168, 169, such being the only outlet from the chamber, the build-up of pressure therein will be very rapid and diaphragm 159 will be raised, carrying therewith the piston member 160 and extension 159, such upward movement being resiliently opposed by spring 164. Such upward movement will cause the upper portion of piston member 160 to abut the lower portion of king-pin 175, and the central boss 183 on the piston member will abut against and raise the central, flexible portion of bearing ring 181 against the force of spring 179, raising such portion and providing a sealing connection for the passage of fluid under pressure from passage 168 to passage 177. The beveled or rounded peripheral edge of the piston member 160 will cooperate with the flared portion of ring 188, and the upwardly-extending marginal flange on the piston member will abut the central, flexible portion of bearing ring 187, raising the same against the force of spring 185 and providing a sealing connection for the passage of fluid under pressure from passage 171 to passage 176. It will be noted that fluid under pressure in chamber 178 in the king-pin will exert a downward pressure on bearing ring 181, thereby effecting a better sealing connection between such ring and the boss 182.

It is to be particularly noted that in the forms illustrated in Figs. 2, 3 and 4, the flexible diaphragms employed will automatically compensate for any misalignment of the cooperating portions of the coupling, thus making it unnecessary to flexibly mount the tractor-carried coupling portion as in Fig. 1.

A still further form which the invention may take is disclosed in Fig. 5, the same being illustrated in combination with a bracket 200 which is mounted on the lower side of the tractor fifth wheel device and to which is resiliently attached a cylinder member 201 having outwardly-extending flange portions 202 intermediate the ends thereof and an inturned annular flange 203 at the upper end thereof. Flanges 202 are resiliently attached to bracket 200 by means of bolts 204 extending through holes in said flanges and through oversize holes in the bracket member and carrying, at their lower ends, the spring bearing plates 205, against which bear the lower ends of springs 206, the upper ends of which bear against the bracket 200. The cylinder member 201 may extend through an opening 207 in the bracket member. The lower end of the cylinder member is closed by a closure member 208 connected thereto by screws or other suitable connecting means, and said closure member is provided with an integrally-formed, upwardly-extending tubular member 212, located centrally thereof and having extending longitudinally therethrough a passage 209, terminating at its lower end in a screw-threaded portion 210 to which may be connected the tractor emergency line. The closure member 208 is also provided with a screw-threaded opening 230, the same opening into the chamber within the cylinder 201 and surrounding the tubular member 212, and which opening 230 may be connected to the tractor service line.

A piston 211 is slidably disposed in the cylinder 201 and is provided with a central bore or chamber 213 which slidably receives the tubular member 212 and into which the passage 209 opens at its upper end. A cup-shaped washer 214, attached to the upper end of the tubular member 212 by nuts or other suitable means, provides a sealing engagement for preventing the leakage of fluid under pressure from chamber 213. Piston member 211 is provided with a shoulder portion 215 against which bears the lower end of a spring 216, the upper end of which bears against the flange 203, whereby the piston is constantly urged to its lowermost position. The lower face of the piston member is provided with a cup-shaped sealing washer 217, the same being attached thereto by screws or other suitable means. Piston member 211 is provided with an upper portion 218, attached thereto by screws 219, and which is provided, in the lower part thereof, with a chamber 220 which communicates with a chamber 221 formed in the upper portion of the lower part of piston 211, and both of which chambers communicate, through passage 222, with the chamber 213. A bore 223 extends through the upper portion 218 of the piston and opens at its upper end to atmosphere and at its lower end opens into the chamber 220, and said bore has, slidably mounted therein, the valve stem 224, the upper end of which extends above the upper end of the piston member, and the lower end of which is provided with a valve head 225, the same being disposed in chamber 220. A spring 226 bears at its upper end against the valve head 225 and at its lower end against a shoulder defining the chamber 221, thereby normally maintaining valve head 225 against its seat and closing communication between chamber 220 and passage 223. The upper portion 218 of the piston member is provided with an upwardly-extending peripheral flange 227 and an annular recess 228, the latter defining a central, upwardly-extending boss 229, through which extends the passage 223 and valve stem 224. A passage 234, provided in the piston member 211, 218 and extending longitudinally therethrough, opens at its lower end into the chamber within cylinder 201 below piston member 211, and at its upper end opens into the annular recess 228 in the upper face of piston member 218.

A king-pin device 231 is mounted on the trailer vehicle for cooperation with the piston device 211, 218, and said king-pin is provided with longitudinally-extending passages 232, 233 which may be connected to the trailer service and emergency lines respectively. The lower face of the king-pin device is provided with an annular recess 235 into which the trailer service passage 232 opens and which is adapted to receive the peripheral flange or extension 227 on the piston device when the piston member is in its raised position, and a central chamber 236 into which the trailer emergency passage 233 opens and which is adapted to receive the central extension or boss 229 of the piston device when said piston is in its raised position. A flexible sealing ring 237 is provided in the annular recess 235, the same being held in position therein by a clamping ring 238, and adapted to cooperate with the peripheral extension 227 when the same is in its raised or operative position. The central bore or recess 236 in the king-pin is also provided with a flexible sealing ring 239, the same being secured therein by a clamping member 240 and adapted to cooperate with the central boss or extension 229 when the same is in raised or operative position.

In the operation of the above described device, the tractor service line is connected to the screw-threaded opening 230 and the tractor emergency line to the screw-threaded opening 210, the latter line having a valve therein for controlling the flow of fluid under pressure therethrough. Spring 216 normally maintains the piston member 211, 218 in its lowermost position at the bottom of cylinder 201, and spring 226 normally maintains the valve head 225 against its seat, thereby shutting off communication between chamber 220 and the atmosphere. To connect the tractor and trailer braking systems, the piston device must be brought under the king-pin device by manipulation of the tractor vehicle, and the valve in the tractor emergency line operated to cause fluid under pressure to flow therethrough. Such fluid under pressure from the tractor emergency line will flow through passage 212, chamber 213, passage 222, chamber 221 and chamber 220, and, due to the fact that communication therefrom to the atmosphere is shut off by valve head 225, the build-up of pressure in said chambers will be rapid and such pressure will exert an upward force on the piston member through the end walls of said chambers, thereby raising the piston into cooperation with the king-pin device. On upward movement of the piston member, the peripheral extension 227 on the piston will coincide with and enter the annular recess 228 in the king-pin device and the central extension 229 on the piston member will enter the central chamber or depression 236 in the king-pin. As the extension 229 enters the recess 236, the valve stem 224, normally extending above the upper face of the piston, will abut the bottom of the recess 236 and further upward movement thereof will be stopped. It will be apparent that further upward movement of the piston will cause the seat of valve member 225 to move away from said valve, thereby permitting fluid under pressure to flow from the tractor emergency line to the trailer emergency line through passage 209, chamber 213, passage 222, chamber 221, chamber 220, past opened valve 225, through passage 223 to passage 233 in the king-pin. The tractor and trailer service lines will be connected when the piston member is seated in its uppermost position, such connection being established through the screw-threaded opening 230, the chamber within the cylinder 201, passage 234, recess 228, recess 235, and passage 232. If it is desired to disconnect the tractor and trailer braking systems, the flow of fluid under pressure through the tractor emergency line must be shut off and that portion of said line which is connected to the above described connecting means must be vented to atmosphere, such operation being performed by valve means in the tractor emergency line. Such venting of the emergency line will cause the passage 209, chamber 213, passage 222, and chambers 221 and 220 to be connected to atmosphere and the spring 216 will then return the piston member to its lowermost position, and spring 226 will move valve head 225 to its seat, thereby preventing any possible escape of emergency line pressure to atmosphere.

A still further form which the invention may take is disclosed in Fig. 6, and the same is illustrated in combination with a tractor vehicle, of which one part 350 is disclosed, and which carries a fifth wheel device 351, the same being adapted to cooperate with the king-pin device 352 carried by a trailer vehicle 353. The braking system of the trailer vehicle has connected thereto the pipes 354 which pass through the king-pin device and open on the lower face thereof. The braking system of the tractor vehicle has connected thereto the pipes 355, and said pipes are connected, by flexible tubes 356, to an airline socket 357 which is bored to provide continuing passages for the pipes 356.

Fluid pressure-operated means are provided for bringing the upper face of the airline socket into abutting engagement with the lower face of the king-pin device 352 in order to connect the tractor and trailer braking systems. Such means comprise a diaphragm chamber 358, carried by the tractor fifth wheel device 351 and depending from the lower side thereof, preferably in front of and aligned with the trailer king-pin device when the tractor and trailer vehicles are coupled. Also depending from the lower side of the tractor fifth wheel device, and in a position between the diaphragm chamber and the king-pin device 352 when the vehicles are coupled, is a bracket 359 to the lower extremity of which is pivoted a bell crank lever having a longer, normally horizontal arm 360 and a shorter, vertical arm 361, the latter being connected at its lower extremity to the outer end of a piston rod 362 which is connected to and extends rearwardly from the diaphragm in chamber 358. The outer end of arm 360 of the bell crank lever is forked to surround the airline socket 357 and each arm of said fork is provided with a longitudinally-extending slot 363 for receiving a pin 364 disposed on the exterior of the airline socket. Connected to the diaphragm chamber 358, on the side of the diaphragm opposite from the piston rod 362, is a pipe 365, the other end of which is connected to the tractor reservoir for supplying fluid under pressure to the diaphragm chamber 358. A valve device 366, including an exhaust port 367, is arranged in said pipe for controlling the flow of fluid under pressure therethrough and said valve may be disposed in the driver's cab on the tractor. A spring or other suitable device may be provided for normally holding the airline socket in a lowered or inoperative position, and such spring may preferably be disposed between the tractor frame and the airline socket or between the diaphragm chamber 358 and the diaphragm therein.

In the operation of the above described structure, the airline socket is normally held in a lowered position by the spring referred to hereinbefore. If it is now desired to connect the tractor and trailer braking systems, the two vehicles are first connected, the tractor fifth wheel device 351 surrounding the king-pin device 352 when such connection takes place, as disclosed in Fig. 6. Fluid pressure may now be admitted into diaphragm chamber 358 through pipe 365 by operation of valve 366, thereby moving the diaphragm and attached piston rod 362 rearwardly, or to the right as viewed in Fig. 6, and rotating the bell crank lever in a counterclockwise direction.

Such rotation of the bell crank lever will move the arm 360 upwardly, the airline socket moving therewith and into engagement with the lower face of the king-pin device, the two parts being firmly held in abutting relation by fluid under pressure in diaphragm chamber 358. Due to the provision of the pin and slot connection between arm 360 and the airline socket, the latter may be rotated as desired to insure proper alignment of the ports therein with the ports in the king-pin device. The diaphragm chamber may be vented through exhaust port 367 by operation of the valve 366 when it is desired to retract the airline socket for disconnection of the tractor and trailer braking systems.

Means are provided by the present invention for controlling the flow of fluid under pressure through the hose lines of the tractor or trailer braking system, such means being advantageous in operating a device as described hereinbefore, in order to properly control the position of the piston member through which the braking system connections are made. One form which such means may take is disclosed in Fig. 7 of the drawings, in which the braking system connecting device 250 is shown, it being understood that such member is not limited in construction to the devices hereinbefore described, but may be any type of pressure-actuated connecting means. Connected to said device 250 are the service line 251 and the emergency line 252, and in such lines are located the valve devices 253 and 254. Valve device 253, in the service line, comprises merely a shut-off valve, whereby communication through said pipe 251 may be opened or closed. Valve device 254 may be operated to either open or shut off communication through pipe 252 but when said valve is operated to shut off communication through pipe 252, that portion of pipe 252 between the valve 254 and the connecting means 250 is vented to atmosphere through an atmospheric port 255 in valve device 254, whereby the coupling device 250 may be vented to atmosphere and the coupling piston retracted from engagement with the trailer king-pin device, as described above. Means are provided for simultaneously operating the valve devices 253 and 254, such means comprising arms 256, 257 connected respectively to the valve devices 253, 254, and connected together by a bar 258, whereby said arms are caused to act in unison. A manual operating means, such as handle 259, may be provided for effecting operation of the arms 256, 257 and the valve devices 253, 254.

It will be obvious that when the tractor and trailer braking systems are to be connected, the driver will operate the handle 259 to move valve devices 253, 254 to establish communication through said valves between the tractor braking system and the coupling device 250. When the tractor and trailer vehicles are to be disconnected, the handle 259 may again be operated to shut off communication through valves 253, 254, thereby disconnecting the coupling device 250 from the tractor braking system and venting the emergency line 252 to atmosphere through port 255.

Modified means for controlling the connection between the tractor braking system and the connecting device is disclosed in Fig. 8, in which figure such means are disclosed in combination with means for locking together the tractor and trailer vehicles after the tractor fifth wheel device 300 has been brought into connecting position relatively to the trailer carried king-pin device 301. A pressure-operated device for connecting the tractor and trailer braking systems is disclosed at 302, and such connecting device may, if desired, be constructed in accordance with the present invention. Such connecting device is connected to the tractor braking system by hose lines 303 and 304, the same being respectively the tractor service line and the tractor emergency line. Valve devices 305 and 306 are disposed respectively in the tractor service line 303 and the tractor emergency line 304 and are adapted to control the flow of fluid under pressure therethrough. Connected to said valves and adapted to operate the same are the arms 307, 308, and said arms are connected by a bar 309 whereby said arms may be operated in unison. Means are provided for simultaneously operating the valves 305, 306 through bar 309 and effecting a physical connection between the tractor and trailer vehicles. Such means comprise a lever 310, pivoted to the fifth wheel device 300 at a point 311 and having connected thereto a locking rod 312, which in its operative position maintains the king-pin device 301 at the bottom of the slot 313 in the king-pin device, and thereby prevents separation of the tractor and trailer vehicles. Bar 309 is also connected to lever 310, as at point 314, and is adapted to be moved longitudinally by movement of said lever. Valve 306 is provided with an atmospheric vent 315 whereby that portion of the emergency line between valve 306 and connecting means 302, as well as the connecting means itself, may be connected to atmosphere.

In the operation of the above described device, if it is desired to connect the tractor and trailer vehicles, the fifth wheel device 300 is first positioned as illustrated by proper maneuvering of the tractor vehicle, and the lever 310 is then operated to put the rod 312 in its operative position whereby the two vehicles will be securely attached. Such operation of lever 310 will cause a longitudinal movement of bar 309, thereby effecting simultaneous operation of the valves 305, 306 to connect the tractor braking system to the connecting device 302, whereby the tractor-trailer braking systems connecting means will be operated in a manner hereinbefore described. If it is now desired to disconnect the tractor and trailer vehicles, the lever 310 will again be operated to withdraw rod 312 from its operative position to permit the tractor vehicle to be moved away from the trailer vehicle. Such operation of lever 310 will operate valves 305, 306 to shut off communication between the tractor braking system and the connecting device, and also to vent the emergency line portion of the connecting device to atmosphere, whereby the piston thereof is retracted in a manner fully described hereinbefore.

Preferably the construction of the above described parts is such that valves 305 and 306 will not start to open until the locking rod 312 has partially engaged the king-pin 301 and conversely that the said valves will be fully closed and vent 315 opened before the locking rod is fully disengaged from the king-pin. This arrangement insures that the movable portion of the coupling may not be extended until the tractor and trailer fifth wheel members are definitely in alignment, and also insures that said coupling portion is fully retracted before the said fifth wheel members are moved out of alignment, thus preventing any possibility of damage to the coupling.

While several modifications of the invention have been described and illustrated, it is to be expressly understood that the invention is in no way limited thereby and that various changes and modifications may be made without departing from the scope of the invention, for the limits of which reference must be had to the appended claims.

What is claimed is:

1. Coupling means for connecting fluid pressure braking systems having emergency and service lines carried by leading and trailing vehicles of the type adapted to be mechanically coupled together through a king pin positioned on the trailing vehicle, comprising means operable by fluid pressure in said leading vehicle emergency braking line for connecting said vehicle emergency and service braking lines through said king pin.

2. Coupling means for connecting fluid pressure service lines carried by a leading and trailing vehicle of the type adapted to be mechanically coupled together through a pair of members respectively positioned on said vehicles, said means including one member positioned on the trailing vehicle, connections between said last named member and the service lines on the trailing vehicle, a device carried by the other member positioned on the leading vehicle and communicating with the service lines on the leading vehicle, said device including a pressure responsive element, and means for subjecting said element to the pressure in one of said service lines on the leading vehicle communicating with the device for effecting movement of said element into sealing engagement with said member positioned on the trailing vehicle to connect said service lines communicating with the device to the service lines connected with said member positioned on the trailing vehicle.

3. Coupling means for vehicle carried fluid pressure braking systems comprising a member carried by one vehicle and having connections with the braking system thereof, means carried by another vehicle and having a pair of conduits connected with the braking system thereof, and means actuated by fluid pressure in one of said conduits for moving said first named means into engagement with said member to connect said pair of conduits with the braking system of one vehicle.

4. Means for coupling vehicle carried fluid pressure braking systems of the type including service and emergency lines, comprising a member carried by one vehicle and communicating with the braking system thereon, a member carried by another vehicle and communicating with the braking system thereof, and means responsive to pressure in the emergency line on said last named vehicle for moving the second named member into coupling engagement with the first named member to respectively couple the emergency and service lines of one vehicle with the emergency and service lines of the other vehicle.

5. Means for coupling vehicle-carried fluid pressure braking systems of the type including service and emergency lines, comprising a coupling device on one vehicle connected with the braking system thereof, a cylinder carried by another vehicle having a connection to the service line thereof, a piston in said cylinder having a passage therethrough communicating with the service line of the last named vehicle, said piston coacting with said device to connect said braking systems, a member extending longitudinally within said piston and having a connection therethrough to the emergency line of the last named vehicle, and means normally urging said piston to its inoperative position.

6. Means for coupling vehicle-carried fluid pressure braking systems of the type including service and emergency lines, comprising a member carried by said trailing vehicle and connected with the braking system thereof, a cup-shaped member carried by said leading vehicle and having a connection to said emergency line, a piston member movable relatively to said cup-shaped member and having a connection to said service line and a passage therethrough, and means responsive to pressure in said emergency line for moving said piston into cooperative relation with said member to connect said braking systems.

7. Means for coupling vehicle-carried fluid pressure braking systems of the type including service and emergency lines, comprising a cylinder member, a plurality of diaphragms supported by said cylinder member, a connection intermediate said diaphragms to said service line, a piston supported by said diaphragms, a member slidable within said piston, a passage through said member communicating with said emergency line, a valve in said passage, and means normally maintaining said piston and diaphragms in inoperative position.

8. Means for coupling vehicle-carried fluid pressure braking systems of the type including service and emergency lines, comprising a cylinder member having a connection to said emergency line, a diaphragm closing one end of said cylinder member, a chamber on the other end of said cylinder member, a piston member supported by said diaphragm and having a connection to said service line, a passage through said piston communicating with the interior of said cylinder member, an extension on said piston extending into said chamber, and a spring in said chamber and cooperating with said extension to constantly urge said piston to inoperative position.

9. Means for coupling vehicle-carried fluid pressure braking systems of the type including service and emergency lines, comprising a cylinder carried by said leading vehicle, a piston slidable within said cylinder, a tubular member on said cylinder and mounted to slide within said piston, a valve within said piston, a spring normally seating said valve, a stem on said valve and having a portion extending above the upper face of said piston, a connection between said cylinder and said emergency line, a passage through said tubular member and said piston connected to said service line and normally closed by said valve, and means constantly urging said piston to its inoperative position.

10. Coupling means for vehicle-carried fluid pressure braking systems of the type including service and emergency lines, comprising means operable by fluid pressure in the emergency line of one vehicle for respectively connecting the emergency and service lines of said one vehicle with the emergency and service lines of another vehicle.

STEPHEN JOHNSON, Jr.
WILFRED A. EATON.